United States Patent [19]

Powell

[11] Patent Number: 4,826,299

[45] Date of Patent: May 2, 1989

[54] LINEAR DEIVERGING LENS

[75] Inventor: Ian Powell, Gloucester, Canada

[73] Assignee: Canadian Patents and Development Limited, Ottawa, Canada

[21] Appl. No.: 8,830

[22] Filed: Jan. 30, 1987

[51] Int. Cl.$^4$ .................. G02B 13/18; G02B 5/04
[52] U.S. Cl. .................. 350/432; 350/286; 350/433
[58] Field of Search .............. 350/432, 433, 434, 435, 350/286

[56] References Cited

U.S. PATENT DOCUMENTS

| 4,613,212 | 9/1986 | Norikazu | 350/432 |
| 4,655,556 | 4/1987 | Kajitani | 350/432 |
| 4,657,352 | 4/1987 | Suda et al. | 350/432 |
| 4,743,093 | 5/1988 | Oinen | 350/432 |

Primary Examiner—John K. Corbin
Assistant Examiner—Scott J. Sugarman
Attorney, Agent, or Firm—Yoshiharu Toyooka

[57] ABSTRACT

A new type of lens is described. The lens has the appearance of a prism with a relatively sharp radius at the apex. This lens finds an application in expanding a laser beam in one direction only.

12 Claims, 7 Drawing Sheets

FIG. 1
PRIOR ART

TAU=0.0

TAU=0.0

TAU = 0.0

$\phi \simeq 60°$

FIG. 12

$\phi \simeq 60°$

FIG. 13

FIG. 15
$\phi \simeq 80°$

FIG. 14
$\phi \simeq 80°$

PRIMARY SURFACE

| DIVERGENCE | RADIUS OF CURVATURE 1/c | CONIC CONSTANT Q | LENS SHAPE | GLASS |
|---|---|---|---|---|
| = 15° | 0.8 | −10.0 | | BK7 |
| = 30° | 0.4 | −3.2 | | BK7 |
| = 60° | 0.2 | −1.6 | | BK7 |
| = 90° | 0.12 | −1.2 | | BK7 |
| = 60° | 0.12 | −1.6 | | BK7 |
| = 30 | 0.4 | −4.5 | | BK7 |
| = 60° | 0.2 | −2.5 | | BK7 |
| = 60° | 0.32 | −2.5 | | SF6 |
| = 80° | 0.18 | −1.6 | | BK7 |
| = 70° | 0.18 | −1.6 | | BK7 |

FIG. 16

LINEAR DEIVERGING LENS

FIELD OF THE INVENTION

The present invention is directed to optical elements e.g. lenses and in particular to a two surface lens resembling a prism with a relatively sharp radius at its apex and whose primary surface can be closely described by a one dimensional conical.

BACKGROUND OF INVENTION

To eliminate unnecessary wastage during the cutting process of any type of material such as wood, textiles etc, it is important to have adequate control in the alignment mechanism. Laser beams are widely used for alignment purposes. In making a laser beam draw a line of light on an object, it has been common to employ a polygonalprismatic mirror rotated at a high speed, to which a laser beam is incident to make the reflected laser beam sweep the surface of the object. However, this arrangement calls for a complicated device which rotates the mirror at a high speed.

Another tool which has recently arrived on the market and has proven to be relatively successful in the mechanics of alignment is a He-Ne laser with a lens attachment (e.g. cylindrical lens) on the front for expanding the beam in one direction. Ideally the projected laser beam should be a well-defined line being uniform in both width and intensity along its length. However, the design of these elements has been based on a somewhat trial and error approach resulting in a laser line which varies significantly in intensity along its length.

U.S. Pat. No. 4,589,738 May 20, 1986 (Ozaki) describes various other optical arrangements for projecting a laser beam in a linear pattern, e.g. line, square etc. The patent uses a convex reflector or a concave lens to spread a laser beam radially and then a cylindrical-concave reflector to converge the beam linearly to project a line etc. Although the arrangements mentioned in the patent are complex requiring a variety of optical elements in strict alignment, each of the systems suffers from the same drawback as found with the cylindrical lens i.e. non-uniformity in intensity along the length of the line. The distribution is in fact what is known gaussian which is the same as that found across the beam leaving the laser head.

The present invention solves these prior art problems associated with the line projection of a laser beam. A new optical lens element of the present invention expands a laser beam in one direction to project a beam line of uniform intensity and width having well defined ends.

OBJECT OF THE INVENTION

It is an object of the present invention to provide a new lens.

It is a further object of the present invention to provide a new lens which can expand a laser beam in one direction.

SUMMARY OF THE INVENTION

Briefly stated, an optical lens of the present invention has at least two surfaces, the primary of which has an apex and is shaped to conform to a curve defined in a (x,y,z) cartesian coordinate system by the following equation $$z = \frac{cy^2}{1 + (1 - (1 + Q)c^2y^2)^{\frac{1}{2}}}$$

where y and z are independent of x, c is the curvature at the apex and Q is the conic constant in that. The magnitude of the product, $Q \cdot c$, lies between 0.25 and 50 mm$^{-1}$ and Q is less than $-1$.

BRIEF DESCRIPTION OF THE DRAWINGS

For more complete understanding of the present invention and for further objects and advantages thereof, references may now be made to the following description taken in conjunction with the accompanying drawings in which.

DETAILED DESCRIPTION OF THE PREFERRED EMBODIMENTS OF THE INVENTION

Figure 1:
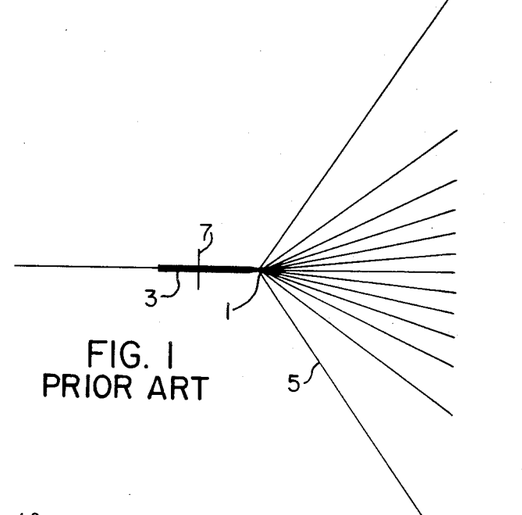
FIG. 1 shows a prior art laser beam expander using a cylindrical lens.

FIG. 1 shows a prior art line expander using a cylindrical lens located at 1. A laser beam 3 is directed at the lens 1 and is spread in the forms of rays 5. The rays are shown traced parallel to the optical axis at different heights in the aperture 7. A typical 5 mW He-Ne laser is used. It has a natural beam divergence of 1.3 milliradians and a beam diameter of 0.8 mm at $1/e^2$ of maximum intensity. Assuming one allows the aperture of the diverging element to be twice this value, a very small fraction of the total radiation would be wasted. The minimum radius of curvature associated with the cylindrical lens for which total internal reflection for any ray within the incident beam would be absent is around 0.9 mm.

Figure 2:
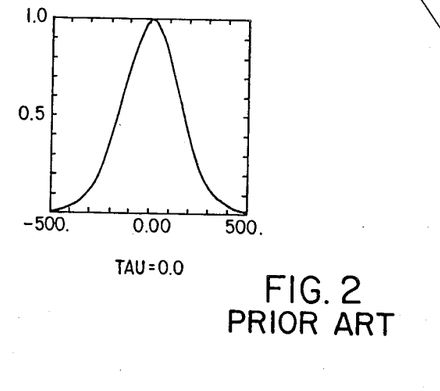
FIG. 2 is a graph showing the intensity distribution of a projected line in the arrangement of FIG. 1.

FIG. 2 depicts the intensity distribution of the expanded beam one might expect at a distance of 1m from the cylindrical lens using the above arrangement. The graph shown in the figure is the result of a computer simulation and indicates the distance from the optical axis in mm on the horizontal axis and the normalized intensity on the vertical axis.

As expected, the distribution is basically gaussian. The spherical aberration (one dimensional) which is introduced by the lens has the effect of spreading the tails of the line out even more than if the system were in fact diffraction-limited.

In analyzing these results, the inventor has realized that if uniformity in intensity is to be achieved, it is necessary to spread out the radiation more at the center while somehow contain it at the edges. If one were to consider a single optical element having say, a primary and a secondary surface then this would mean firstly that the region at the center of the primary surface should vary more rapidly (i.e. steeply) allowing the rays a greater divergence and secondly that the rate of change in this surface's gradient at points further away from the center should be small. The function of the secondary surface is by simple refraction to increase the divergence of the fan of rays incident on it rather than affect the uniformity over the line's length.

These conditions, together with a practical manufacturing constraint i.e. any discontinuity within the surface must be avoided, have led the inventor to believe that a lens comprised of 2 surfaces one of which is a linear conic having a short radius and a relatively large conic constant would satisfy these criteria. The conic surface is two dimensional in (y,z) plane of (x,y.z) cartesian coordinate system and can be described by the following equation:

$$z = \frac{cy^2}{1 + (1 - (1 + Q)c^2y^2)^{\frac{1}{2}}}$$

where c is the curvature and Q the conic constant. The Y and z are independent of x. aspheric terms normally appearing in the generalized equation for a surface have been omitted since they would be redundant, introducing rapid changes in the surface's profile only at the outer periphery. Therefore for a given beam diameter, having identified the material for the lens and knowing its refractive index there are just the two parameters to consider, the radius of curvature and the conic constant. Unless stated otherwise, the material chosen in these embodiments was optical glass, type BK7, having a refractive index of around 1.52.

Figures 3, 4, 5:
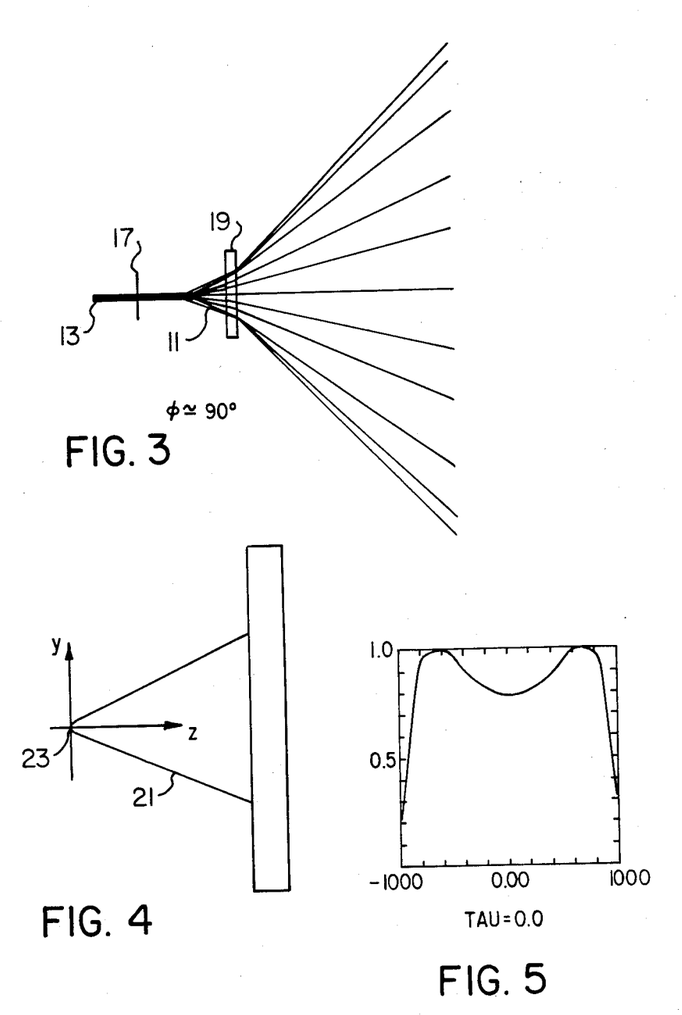
FIG. 3 shows an optical arrangement using a lens made according to one embodiment of the present invention.
FIG. 4 is an enlarged cross sectional view of the lens used in FIG. 3.
FIG. 5 is a graph showing the intensity distribution according to the embodiment of FIG. 3.

FIG. 3 shows a lens according to the present invention used as a laser beam expander in place of the cylindrical lens shown in FIG. 1. A lens 11 is irradiated by a laser beam 13 through an operture 17. The beam is spread in the form of rays 15 and an optional optical, substrate 19 supports the lens in line with the laser beam 13. In order to illustrate the nature of the curve, FIG. 4 gives an enlarged cross-sectional curve 21 (enlarged several times) of the lens, having an apex 23. The curve 21 conform in a (y-z) cartesian coordinate system to the above-described equation. The x axis is not shown in the figure but is perpendicular to the drawings sheet. As in the cylindrical lens discussed above, y and z values are independent of x values. Thus the lens 11 of FIG. 3 resembles a prism. Like a prism, the lens does not have rotational symmetry. Instead the lens has two principal sections, one in (y,z) plane with power of focussing, and another in (x,z) plane without it. In each section, there exists a plane of symmetry.

Using the lens shown in FIG. 4 (radius of curvature 1/c=0.12mm, conic constant Q=−1.2), the intensity distribution has been computer-simulated and verified in experiments. FIG. 5 shows the result of the computer-simulation for the intensity distribution at a distance of 1 m from the lens. As in FIG. 2, the horizontal axis is the distance from the optical axis in mm's and the vertical axis is the normalized intensity. As seen in the figure, the laser beam is expanded about 90°, projecting a line of 2 m long at the distance of 1m from the prism. The uniformity in intensity is apparent with the ends of the line being very well defined, clearly illustrating marked improvements over the prior art using a cylindrical lens.

Figures 6, 7, 8:
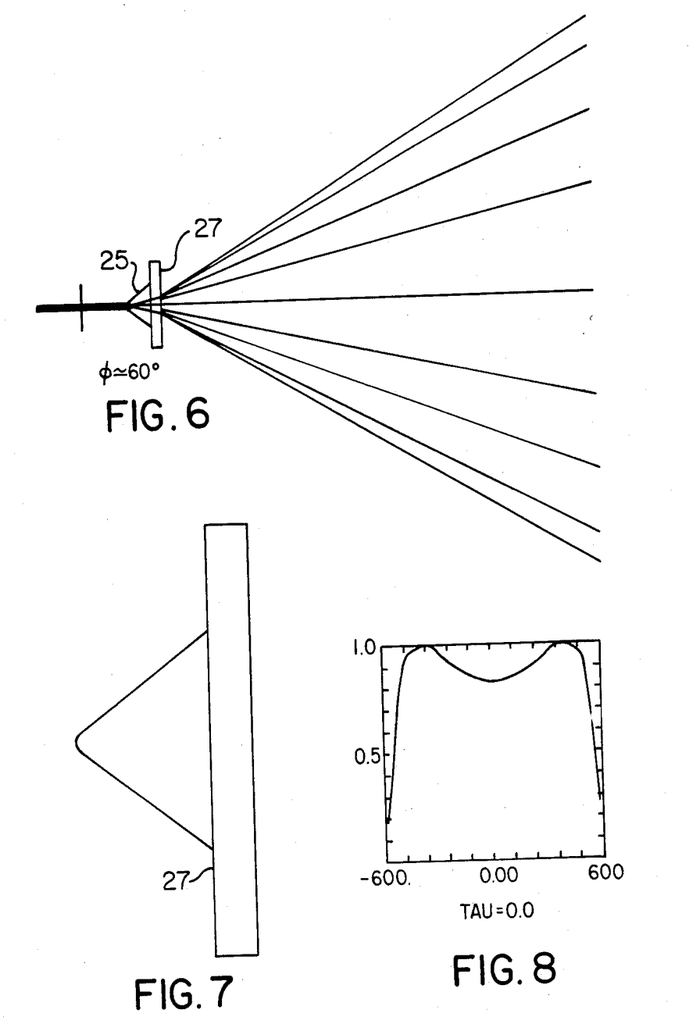
FIG. 6 shows an optical arrangement using a lens made according to another embodiment of the invention.
FIG. 7 is an enlarged cross sectional view of the lens used in FIG. 6.
FIG. 8 is a graph showing the intensity distribution in the embodiment of FIG. 6.

FIG. 6 shows another embodiment using a lens 25 whose enlarged cross section is in FIG. 7. As in FIG. 3, a substrate 27 is provided to support the lens. The intensity distribution at a distance of 1m is computer-simulated and is shown in FIG. 8. The beam is expanded about 50°, projecting a uniform line of 1.2m long with well defined ends. The lens in this embodiment has a radius of curvature of 0.2 mm and a conic constant of −1.6.

Figures 9, 10, 11:
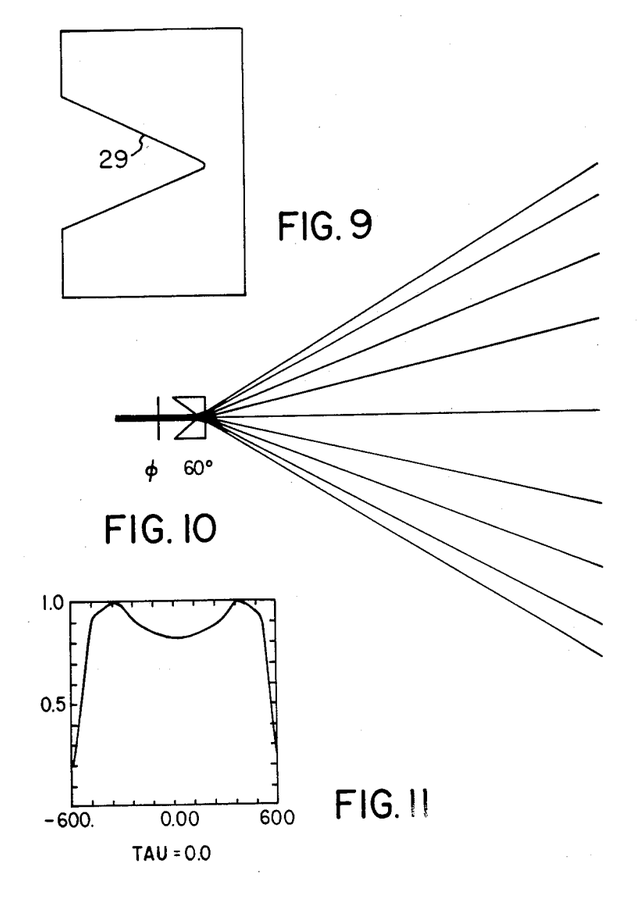
FIG. 9 is an enlarged cross sectional view of a negative lens made according to the other embodiment of the present invention.
FIGS. 10 and 11 show an optical arrangement using the negative lens of FIG. 9 and the intensity distribution.

It is possible to design a negative lens, that is, a lens having a negative surface of the same curve. FIG. 9 illustrates one such lens using the curve 29 identical to curve 21 of FIG. 4. An arrangement and the intensity distribution are shown in FIGS. 10 and 11.

Figure 12:
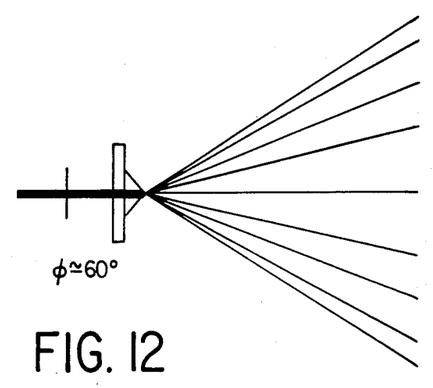
FIGS. 12, 13, 14 and 15 illustrate other optical arrangements according to still other aspects of the present invention.
Figure 13:
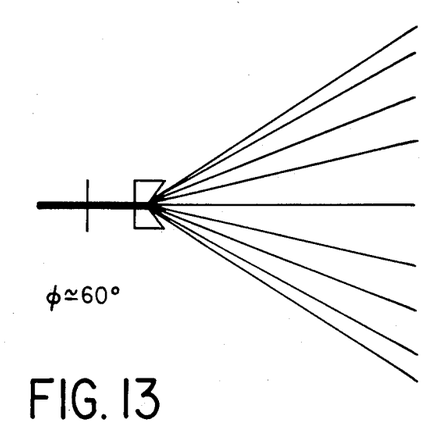

It is possible to design lenses facing the opposite direction to those described above and still obtain a uniformly diverging beam. FIGS. 12 and 13 show such orientations.

In these orientations, where non-normal incidence refraction occurs only at the second surface, the amount of divergence is limited to the wedge angle of the prism which in turn has a minimum angle depending on the critical angle. For example the maximum divergence attainable from a lens made of low index crown e.g. BK7 would be around 100 degrees which holds true for both positive and negative lenses.

Figure 14:
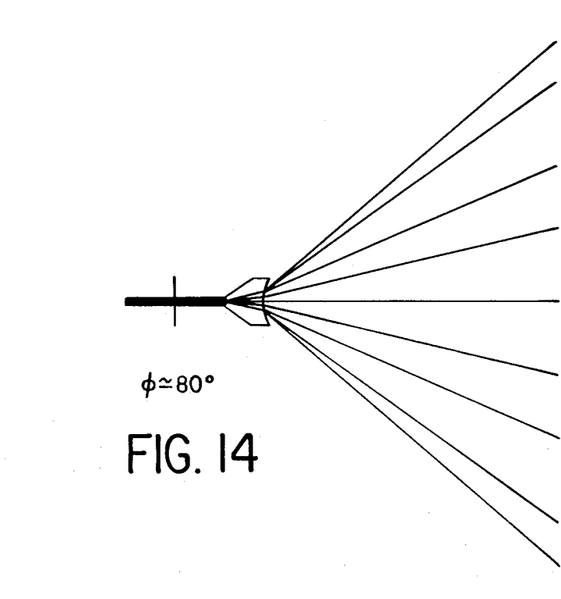
Figure 15:
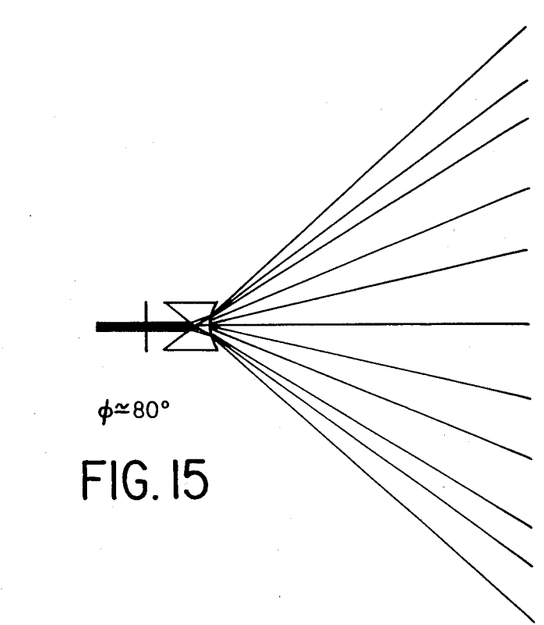

FIGS. 14 and 15 show still other embodiments. In these embodiments, the lenses contain, in addition to the conic primary surface, a second surface which is both cylindrical or spherical and a negative. This curved secondary surface enables a wider expansion of the beam with no deterioration in the beam uniformity.

Limits Placed on the Parameter of the Lens i.e. Curvature and Conic Constant:

Design of such a lens is dependent on (1) the laser beam diameter, (2) the output beam divergence, (3) the refractive index of the lens, and (4) the orientation of the lens i.e. which way it is facing.

Figure 16:
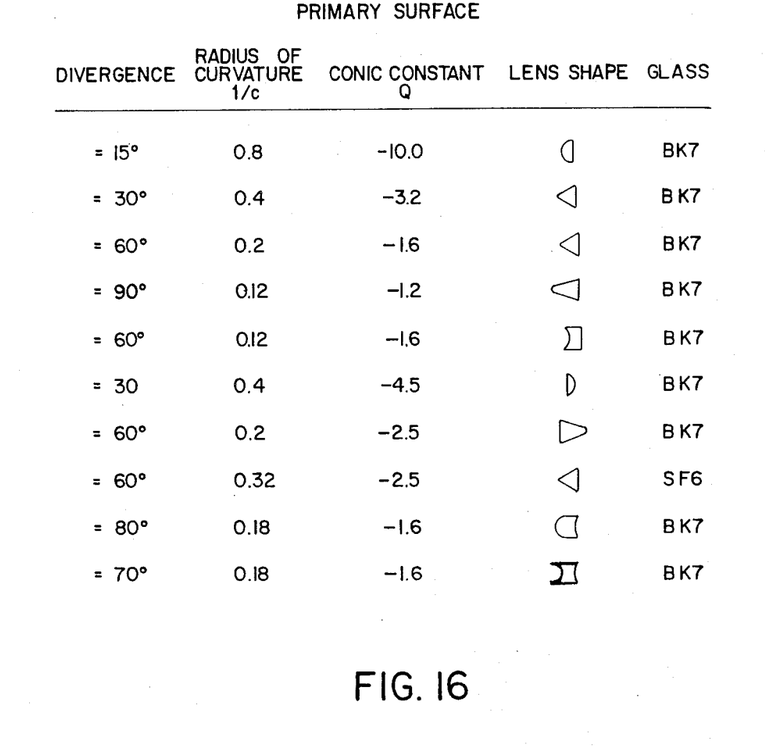
FIG. 16 is a table showing parameters for various lens surfaces.

Typical values are given in FIG. 16 in which the parameters are calculated for 5 mW HeNe laser having a beam diameter of 0.8 mm at $1/e^2$ of maximum intensity.

It is seen from this figure that the magnitude of the product, Q·c, of the conic constant and the curvature for the primary surface lies between 7.8 and 12.5 mm¹. If the diameter of beam were to be varied the optimum radius would also vary by the same factor with no change in the value of the conic constant. For example, of the beam diameter changed by a factor of ¼, ½, 5 or 30, the above range of product for the conic constant and curvature would lie between (31.2 and 50 mm⁻¹), (15.6 and 25 mm⁻¹), (1.5 and 2.5 mm⁻¹), and (0.25 and 0.4 mm⁻¹). These products are most uncommon for any optical surface as the following background information will attest to. Optical systems generally comprise elements whose surfaces are spherical or flat. Those surfaces which are aspherical would normally have conic constant values whose magnitude would be below 1. For the extremely small percentage of surfaces which do have conic constant values whose magnitude is greater than 1, would have a radius of curvature whose magnitude is greater than 10 mm, and more probably greater than 100 mm. Therefore it is more unlikely to have a surface in an optical system which has a conic constant and curvature whose product is greater than say 0.1.

We claim:

1. An optical lens having at least two surfaces, the primary surface and the secondary surface, the primary surface having a relatively sharp apex and being shaped to conform to a curve defined in a (x,y,z) cartesian coordinate system by the following equation $$z = \frac{cy^2}{1 + (1 - (1 + Q)c^2y^2)^{\frac{1}{2}}}$$

where y and z are independent of x, c is the curvature at the apex and Q is the conic constant in that the magnitude of the product, Q·c, lies between 0.25 and 50 mm$^{-1}$ and Q is less than $-1$.

2. The optical lens according to claim 1, wherein the secondary surface is selected from a group of shapes consisting of flat, negatively cylindrical and negatively spherical.

3. The optical lens according to claim 2, wherein the primary and the secondary surfaces are furthest from each other at the apex.

4. The optical lens according to claim 2, wherein the primary and the secondary surfaces are closest to each other at the apex.

5. A laser beam expander for expanding a laser beam in one direction, comprising:

a source of the said laser beam; and an optical lens having an apex and located relative to the source so that the apex is in the laser beam; in that the optical lens has at least two surfaces, the primary and the second surfaces;

the said primary surface containing the said apex and being shaped to conform to a curve defined in a (x,y,z) cartesian coordinate system by the following equation:

$$z = \frac{cy^2}{1 + (1 - (1 + Q)c^2y^2)^{\frac{1}{2}}}$$

where y and z are independent of x, c is the curvature at the apex and Q is the conic constant in that the magnitude of the product Q·c, lies between 0.25 and 50 mm$^{-1}$ and Q is less than $-1$.

6. The laser beam expander according to claim 5, wherein the secondary surface is selected from a group of shapes consisting of flat, negatively cylindrical and negatively spherical.

7. The laser beam expander according to claim 6, wherein the primary and the secondary surfaces are furthest from each other at the apex.

8. The laser beam expander according to claim 6, wherein the primary and the secondary surfaces are closest to each other at the apex.

9. The laser beam expander according to claim 7 wherein the primary surface is oriented toward the source of the laser beam.

10. The laser beam expander according to claim 8 wherein the primary surface is oriented toward the source of the laser beam.

11. The laser beam expander according to claim 7 wherein the secondary surface is oriented toward the source of the laser beam.

12. The laser beam expander according to claim 8 wherein the secondary surface is oriented toward the source of the laser beam.

* * * * *

UNITED STATES PATENT AND TRADEMARK OFFICE
CERTIFICATE OF CORRECTION

PATENT NO. : 4,826,299

DATED : May 2, 1989

INVENTOR(S) : Ian Powell

It is certified that error appears in the above-identified patent and that said Letters Patent is hereby corrected as shown below:

ON THE TITLE PAGE:

Title at line (54) of the cover sheet and at col. 1, line 1. Title should read
«Linear Diverging Lens»

Signed and Sealed this

Twelfth Day of January, 1993

Attest:

DOUGLAS B. COMER

Attesting Officer     Acting Commissioner of Patents and Trademarks